US010366334B2

(12) United States Patent
Jacobson et al.

(10) Patent No.: US 10,366,334 B2
(45) Date of Patent: Jul. 30, 2019

(54) AUTOMATIC ARTIST AND CONTENT BREAKOUT PREDICTION (71) Applicant: SPOTIFY AB, Stockholm (SE)

(72) Inventors: Kurt Jacobson, Stoneham, MA (US); Daniel E. Stowell, Cambridge, MA (US); Brian Whitman, Brooklyn, NY (US); Athena Y. Koumis, Someville, MA (US); Jason H. Steinbach, Somerville, MA (US)

(73) Assignee: SPOTIFY AB, Stockholm (SE)

( * ) Notice: Subject to any disclaimer, the term of this patent is extended or adjusted under 35 U.S.C. 154(b) by 191 days.

(21) Appl. No.: 15/216,392

(22) Filed: Jul. 21, 2016

(65) Prior Publication Data
US 2017/0024486 A1 Jan. 26, 2017

Related U.S. Application Data (60) Provisional application No. 62/196,750, filed on Jul. 24, 2015.

(51) Int. Cl.
*G06N 5/04* (2006.01)
*H04L 29/06* (2006.01)
(Continued)

(52) U.S. Cl.
CPC .............. *G06N 5/04* (2013.01); *G06F 16/285* (2019.01); *G06F 16/35* (2019.01); *G06F 16/40* (2019.01); *G06F 16/48* (2019.01); *G06F 16/489* (2019.01); *G06F 16/951* (2019.01); *G06F 16/986* (2019.01); *G06F 17/272* (2013.01); *G06F 17/277* (2013.01); *G06F 17/278* (2013.01); *G06N 7/005* (2013.01); *H04L 67/02* (2013.01); *H04L 67/06* (2013.01); *H04L 67/42* (2013.01)

(58) Field of Classification Search
CPC ............................ G06F 17/3053; G06F 17/16
See application file for complete search history.

(56) References Cited

U.S. PATENT DOCUMENTS 8,302,030 B2  10/2012  Soroca et al.
8,311,888 B2  11/2012  Ramer et al.
(Continued)

OTHER PUBLICATIONS

Changyin Sun, Yifan Wang and Haina Zhao, "Web Page Clustering via Partition Adaptive Affinity Propagation", Advances in Neural Networks-ISNN, PartII, pp. 727-736 (2009).*
(Continued)

*Primary Examiner* — Hosain T Alam
*Assistant Examiner* — Anthony G Gemignani
(74) *Attorney, Agent, or Firm* — Merchant & Gould P.C.

(57) ABSTRACT

Methods, systems and computer program products for clustering pages into headline clusters are provided by collecting web data, identifying pages from the web data, tokenizing unique words in each page, recognizing unique entities in each page, detecting media links in each page, and constructing a plurality of vector representations of each page. A first dimension of each vector representation includes the unique words tokenized in each page, a second dimension of each vector representation includes the unique entities recognized in each page, and a third dimension of each vector representation includes the media links detected in each page. The vector representations are, in turn, clustered.

9 Claims, 11 Drawing Sheets (51) Int. Cl.
*G06F 16/35* (2019.01)
*G06F 16/40* (2019.01)
*G06F 16/48* (2019.01)
*G06F 16/28* (2019.01)
*G06F 16/951* (2019.01)
*G06F 16/958* (2019.01)
*G06F 17/27* (2006.01)
*G06N 7/00* (2006.01)
*H04L 29/08* (2006.01)

(56) References Cited

U.S. PATENT DOCUMENTS

| | | | |
|---|---|---|---|
| 8,364,540 B2 | 1/2013 | Soroca et al. | |
| 9,013,553 B2 | 4/2015 | Stephan | |
| 9,058,406 B2 | 6/2015 | Soroca et al. | |
| 9,201,979 B2 | 12/2015 | Ramer et al. | |
| 9,923,793 B1* | 3/2018 | Gore | H04L 43/0876 |
| 2003/0135513 A1 | 7/2003 | Quinn et al. | |
| 2004/0049505 A1* | 3/2004 | Pennock | G06F 17/30592 |
| 2006/0129463 A1* | 6/2006 | Zicherman | G06Q 30/02 705/14.73 |
| 2007/0050353 A1* | 3/2007 | Ekberg | G06F 17/30637 |
| 2008/0208095 A1 | 8/2008 | Kazmierczak et al. | |
| 2009/0049091 A1 | 2/2009 | Slaney et al. | 707/104.1 |
| 2009/0070325 A1* | 3/2009 | Gabriel | G06F 17/30696 |
| 2009/0094095 A1 | 4/2009 | Slaney et al. | |
| 2012/0254188 A1* | 10/2012 | Koperski | G06F 17/30663 707/740 |
| 2013/0339434 A1 | 12/2013 | Nogues et al. | |
| 2014/0160969 A1* | 6/2014 | Grefen | H04L 43/0876 370/252 |
| 2015/0032673 A1 | 1/2015 | Hu et al. | |
| 2016/0103792 A1* | 4/2016 | Bishop | G06Q 10/107 715/209 |
| 2016/0241499 A1* | 8/2016 | Hailpern | G06Q 10/107 |
| 2016/0359680 A1* | 12/2016 | Parandehgheibi | H04L 63/1425 |
| 2017/0024423 A1* | 1/2017 | Liang | G06F 17/30902 |
| 2017/0024486 A1 | 1/2017 | Jacobson et al. | |
| 2017/0024650 A1 | 1/2017 | Jacobson et al. | |
| 2017/0024655 A1 | 1/2017 | Stowell et al. | |
| 2017/0195437 A1* | 7/2017 | Venkataramana | H04L 67/22 |
| 2018/0060882 A1* | 3/2018 | Kirkby | G06Q 30/0275 |

OTHER PUBLICATIONS

Int'l Search Report and the Written Opinion issued in connection with Int'l Appln. No. PCT/US2016/043389 dated Oct. 11, 2016.
Int'l Search Report and the Written Opinion issued in connection with Int'l Appln. No. PCT/US2016/043390 dated Oct. 28, 2016.
Int'l Search Report and the Written Opinion issued in connection with Int'l Appln. No. PCT/US2016/043399 dated Oct. 6, 2016.
Changyin Sun Et al., "Web Page Clustering via Partition Adaptive Affinity Propagation", Advances in Neural Networks—ISNN, Part II, pp. 727-736 (2009).
Int'l Prelim. Rep. on Patentability from Int'l Appl. No. PCT/US2016/043399, dated Jan. 30, 2018.
Int'l Prelim. Rep. on Patentability from Int'l Appl. No. PCT/US2016/043390, dated Jan. 30, 2018.
R. T. Freeman; H. Yin, "Web content management by self-organization", IEEE Transactions on Neural Networks 2005, IEEE Journals & Magazines, vol. 16, Issue: 5 pp. 1256-1268 (2005).
G. Dhivya et al., "Enrich Quality of Content Mining For Web Applications", 2015 Int'l Conf. on Innovations in Information, Embedded and Communication Systems (ICIIECS), IEEE Conf. Publications., pp. 1-5 (2015).
V. Loia et al., "Semantic Web Content Analysis: A Study in Proximity-Based Collaborative Clustering", IEEE Trans Fuzzy Syst., IEEE Journals & Magazines, vol. 15, Issue: 6 pp. 1294-1312 (2007).
T. Martin et al., "Automated Semantic Tagging using Fuzzy Grammar Fragments", 2008 IEEE Int'l Conf. on Fuzzy Systems (IEEE World Congress on Computational Intelligence), IEEE Conf. Publications, pp. 2224-2229 (2008).
Int'l Prelim. Rep. on Patentability from Int'l Appl. No. PCT/US2016/043389, dated Jan. 30, 2018.

* cited by examiner

Bon Iver Played Two New Songs Eaux Claires Music Fest Last Night

Photo by D.L. Anderson. courtesy of Jagjaguwar Records Bon Iver mastermind Justin Vernon and National writer/player/producer Aaron Dessner's inaugural Eaux Claires Music & Arts Festival is underway in Vernon's hometown of Eau Claire, Wisconsin this weekend with a confidently wide-ranging lineup featuring everyone from Sufjan Stevens to Liturgy to gospel legends the Blind Boys of Alabama. Last night Bon Iver headlined and premiered two new songs, despite Vernon's claim to have no plans for his flagship act going forward after the show. The first is slow-burning and blippy, as it builds from Vernon's falsetto and light electronics to a full band climax, while the second affixes backup singers to a soulful, low register Vernon vocal about perseverance. The fan recorded footage is blurry, but the audio is worth checking out. Is Justin up to something? (via) ... — 520

New Bon Iver song (the first one) (Eaux Claires Music and Arts Festival, 7/18/15

— 540

Bon Iver debuts two new songs during first live performance in three years -- watch — 530a
consequenceofsound.net - In the lead up to his Eaux Claires Music Festival, Justin Vernon gave mixed signals over the future of Bon...

Watch Bon Iver debut a pair of new songs - www.factmag.com - Justin Vernon debuts new material at his Eaux Claires Music and Arts Festival. He might not have plans for a ... — 530b

Watch Bon Iver Perform Two New Songs at Eaux Claires Music & Arts Festival- hypetrak.com - While there's no new album coming from Bon Iver, there's still new, unheard music from the influential Wisconsin collective around . . . — 530c

Bon Iver Debut Two New Songs at Eaux Claires Music Festival - pitchfork.com -This weekend saw the launch of the inaugural Eaux Claires Music & Arts Festival, a two-day festival helmed by Bon... — 530d 3 more posts...

AUTOMATIC ARTIST AND CONTENT BREAKOUT PREDICTION

CROSS-REFERENCE TO RELATED APPLICATION

This application claims the benefit of priority to U.S. Provisional Patent Application No. 62/196,750, titled "AUTOMATIC ARTIST AND CONTENT BREAKOUT PREDICTION", filed Jul. 24, 2015, which is herein incorporated by reference.

TECHNICAL FIELD

Example aspects described herein generally relate to automated systems for predicting breakout artists and media content.

BACKGROUND

The ability to consistently predict the next breakout success in music, film, or the arts has long been a holy grail of media-related industries. Media companies rely on predictions to identify talent and evaluate business deals, while consumers often take joy in discovering songs and movies before they find mainstream popularity.

Due to the subjective nature of media, predictions of breakout success require human insights and domain expertise. Journalism has typically played the role of providing these human, insights. Editorial content such as news articles, reviews and interviews typically provide the most meaningful indicators of which new artists and content will have broad appeal.

More recently, the growth of the Internet and the wide adoption of social technologies to share and discuss media have enabled access to a limitless source of editorial content and human insights for better predicting the next big success.

One difficulty with relying on human insights to predict breakout success is that applying such insights to large catalogs of media content in a consistent and/or objective manner is not possible without the use of technology. Today, streaming services have become one of the most popular methods by which media content is distributed to consumers. Media streaming services typically provide subscription access to a catalog of millions of songs, films or television shows, and the most successful media streaming services deliver content globally to millions of consumers. There has yet to be a technical solution for applying insights gleaned from editorial content to large portions of these catalogs.

SUMMARY

It is in view of the above considerations and others that the various embodiments of the present disclosure have been made. The embodiments described herein solve technical challenges to provide other unique and useful functions related to measuring potential breakout success that are significant. The appended independent claims also address technical challenges to provide other unique and useful functions related to measuring potential breakout success that are significant, and the appended dependent claims define advantageous embodiments.

As will be appreciated, the example embodiments described herein address the foregoing difficulty by providing methods, systems and computer program products that go beyond human prediction methods to calculate a measurement of potential breakout success for an entire catalog using editorial content across the web and media streaming data.

According to one embodiment of the invention, an automated system scrapes web content and transforms unstructured data on the worldwide web into structured data or clusters. The system identifies web pages that include the name of an artist or media item and clusters these web pages into one or more headlines. The system then counts the number of headlines for the artist or media item that occurred during a first time period and counts the number of content consumers who played the artist or media item during the first time period and during a second time period. The system calculates a breakout value for the artist or media item using the number of headlines over the first time period, the number of content consumers during the first time period and the number of content consumers during the second time period.

In one embodiment, breakout content is predicted by scraping a network for pages that include a name of an entity, clustering the pages into one or more headline clusters, counting a number of the headline clusters over a first time period, counting a number of content consumers for the entity over the first time period and a number of content consumers for the entity over a second time period, and calculating, a value using the number of headline clusters over the first time period, the number of content consumers over the first time period and the number of content consumers over the second time period.

The value can be calculated according to $$\text{value} = \frac{\text{consumers}_{first\ time\ period} * \log(\text{clusters}_{first\ time\ period})}{\text{consumers}_{second\ time\ period} * \sqrt{\text{consumers}_{second\ time\ period}}}$$

In one example embodiment, the second time period is greater than the first time period. The first time period can be equal to 7 days and the second time period can be equal to 6 months.

According to another example embodiment of the invention, an automated system clusters web pages into headlines by collecting web data and identifying one or more web pages from the web data. The system tokenizes the unique words in each web page and identifies the unique artists or entities mentioned in each web page. The system also detects embedded media or media links in each web page. Vector representations are then constructed for each web page. A first dimension of each vector includes the unique words tokenized in each web page, a second dimension of each vector includes the unique artists or entities recognized in each web page, and a third dimension of each vector includes the embedded media or media links detected in each web page. The system then clusters the plurality of vector representations.

In the example embodiment described above, the clustering may be done, for example, by calculating the pairwise cosine distance between two vectors among the plurality of vector representations. If the pairwise cosine distance is below a threshold value, the two vectors are merged into a cluster. The two vectors are removed from the plurality of vector representations and a cluster vector representation of the two vectors is calculated, for example, as the mean of all vectors in the cluster. The cluster vector representation is reinserted into the plurality of vector representations and the c ring heuristic is repeated until a desired number of clusters is achieved.

In another embodiment, pages are clustered into headline clusters by collecting web data, identifying one or more pages from the web data, tokenizing one or more unique words in each page, recognizing one or more unique entities in each page, detecting one or more media links in each page, constructing a plurality of vector representations of each page, wherein a first dimension of each vector representation includes the one or more unique words tokenized in each page, a second dimension of each vector representation includes the one or more unique entities recognized in each page, and a third dimension of each vector representation includes the one or more media links detected in each page, and clustering the plurality of vector representations.

The one or more media links can be detected in each page by parsing inline frames from HyperText Markup Language (HTML) code of each page.

In another example embodiment, detecting the one or more media links in each page includes parsing source elements from inline frames from HyperText Markup Language (HTML) code of each page and removing extraneous uniform resource locator (URL) arguments from results of the parsing step.

The tokenizing can further include a step of weighting the one or more unique words based on their location in the page.

The clustering can be performed using an affinity propagation clustering technique.

In another example embodiment, the clustering can be performed using a clustering heuristic by calculating a pairwise cosine distance between two vector representations of the plurality of vector representations that have not yet been clustered, merging the two vector representations into a cluster if the pairwise cosine distance is below a threshold value, removing the two vector representations from the plurality of vector representations if the pairwise cosine distance is below the threshold value, calculating a cluster vector representation for the cluster as the mean of all vector representations in the cluster, reinserting the cluster vector representation into the plurality of vector representations, and repeating the clustering heuristic for a set number of iterations. The threshold value can be 0.25. The number of iterations can be 3.

According to yet another example embodiment of the invention, a system uses a selected cohort of content consumers to rate a media object. For example, the system can select a cohort of content consumers who played content from one or more breakout artists before the content became popular. The system can then rate any media object based on the number of content consumers in that cohort who have listened to the media object. The example system identifies a media object and determines a first value and a second value. The first value is equal to the number of consumers who belong to a cohort and who have played the media object. The second value is equal to the total number of consumers who played the media object. The system computes a rating for the media object using the first value and the second value.

In another embodiment, media objects are rated using a selected cohort of content consumers by identifying a media object, determining a first value, wherein the first value is equal to a number of content consumers who belong to a cohort and who have played the media object, determining a second value, wherein the second value is equal to a total number of content consumers who played the media object, and computing, a rating using the first value and the second value.

The rating can be calculated using the following formula, wherein a third value is a constant used to adjust the rating, to give weight to the popularity of the media object among the total number of content consumers:

$$\text{rating} = \frac{\text{first value}}{\text{second value} + \text{third value}}.$$

The third value can be equal to 50.

In another embodiment, the rating is calculated using the following formula, wherein x is a constant used to weight the rating in favor of popularity among total users and y is a constant used to weight the rating in favor of popularity among the cohort:

$$\text{rating} = \frac{(\text{first value})^2}{(\text{first value} + x) + (\text{second value} + y)}.$$

In one example embodiment, the media object is selected based on a number of plays of the media object.

In another example embodiment, the media object is selected based on a release date of the media object.

In yet another embodiment, media objects are rated using a selected cohort of content consumers by identifying a media object, determining a first value, wherein the first value is equal to a number of content consumers who belong to a cohort and who played the media object during a first time period, determining a second value, wherein the second value is equal to a total number of content consumers who played the media object during a second time period, computing a rating using the first value and the second value.

The first time period can be less than the second time period. The first time period can be 1 month and the second time period can be 1.5 months.

In one example embodiment, the cohort comprises content consumers within a predefined geographic region.

In another example embodiment, the cohort comprises content consumers within a predefined demographic.

BRIEF DESCRIPTION OF THE DRAWINGS

The features and advantages of the example embodiments presented herein will become more apparent from the detailed description set forth below when taken in conjunction with the following drawings.

DETAILED DESCRIPTION

In accordance with some embodiments, mechanisms are described herein that use editorial content from across the web, along with user data, to go beyond human prediction methods and calculate a measurement of potential breakout success for every item in a media catalog.

The foregoing examples can be performed in an environment constructed to automatically collect large quantities of user activity data and media content data. In particular, they can be performed in a media streaming or downloading platform that includes systems and servers that store and process user activity data, as well as large collections of media objects, for example, in the form of a media catalog. The platform may also access or store large quantities of web content including, for example, cached web pages.

Figure 1:
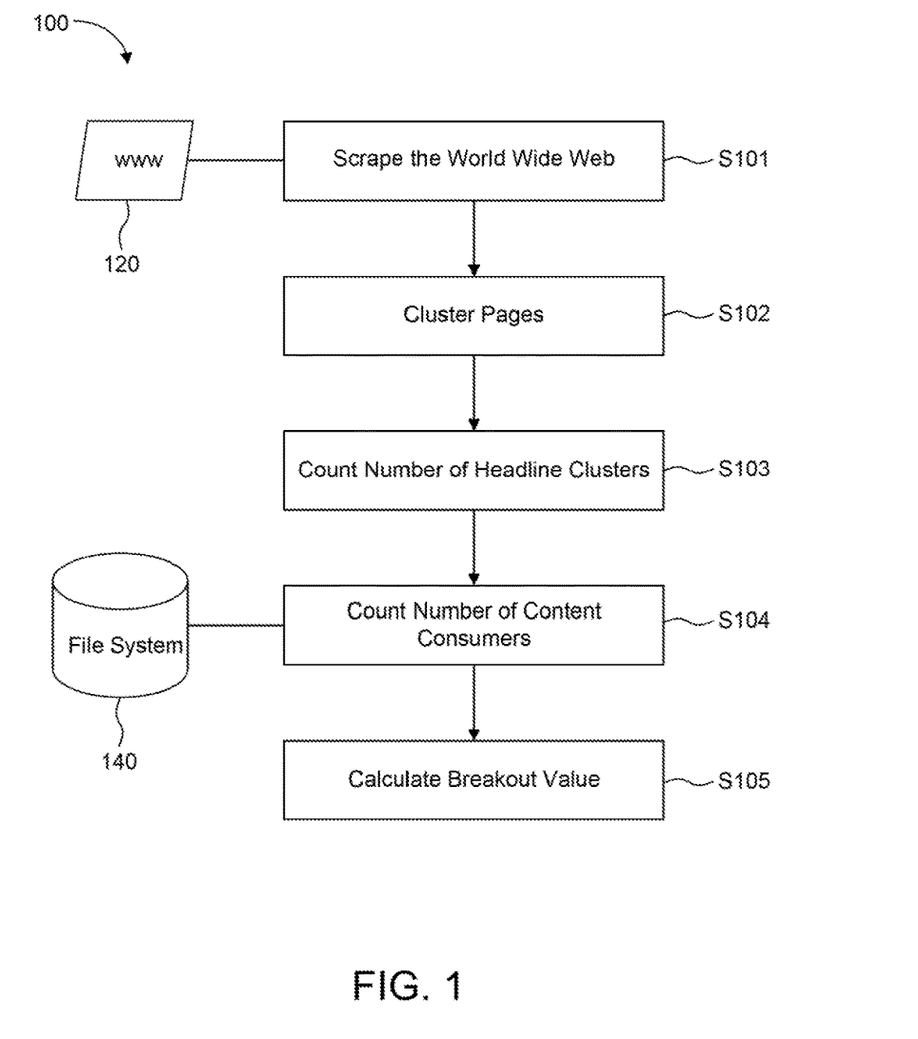
FIG. 1 is a flow diagram of a process for predicting breakout content according to an example embodiment of the invention.

FIG. 1 is a flow diagram of a process for predicting breakout content according, to an example embodiment.

In step S101, web content is collected from the World Wide Web (WWW) 120. The web content can be collected by any presently or future known web scraping or web data extraction techniques. For example, the web content can be collected from Rich Site Summary-(RSS) feeds. Alternatively, the web content can be collected from any other standard web feed format or from any social media stream. Web scraping may also be accomplished using several types of automated systems. For example, static and dynamic web pages can be retrieved through a system that automatically posts HTTP requests to the remote web server. Alternatively, many websites have large collections of pages generated dynamically from an underlying structured source like a database. Since data of the same category are typically encoded into similar pages by a common script or template, a "wrapper" program may be used to detect such templates, extract content and translate it into a relational form. In these instances, some query languages, such as HTQL, can be used to parse HTML pages and to retrieve and transform page content. Yet another example of a web scraping system is a software tool that may attempt to automatically recognize the data structure of a page or provide a recording interface that removes the necessity to manually write web-scraping code. The software may incorporate scripting functions to extract and transform content and database interfaces that can store the scraped data in local databases.

In step S102, individual web pages are identified from within the collected web content and are clustered into headlines or headline clusters, as described more fully below. Example web pages may include blog posts, articles (e.g., news articles) or social media posts. The clustering involves grouping web pages of similar content. For example, all web pages that report a similar news headline or describe the same media content can be clustered together.

In step S103, the number of headline clusters created during a first time period for a given entity is counted. An entity can be an artist, a song or track, a game, a film or television (TV) show, etc. The first time period can be any time period. In one embodiment, the first time period is a number of days or weeks.

In step S104, the number of content consumers who streamed or downloaded a media object associated with the entity is counted for the first time period and for a second time period. In one embodiment, the second time period is greater than the first time period and is a number of weeks, months or years. For example, the first time period could be equal to 7 days and the second time period could be equal to 6 months.

A content consumer is a user who plays or downloads a media object. This could, for example, be a user viewing a video, listening to a song, playing a game or downloading a TV show. A play can be measured or defined by any number of presently or future known methods. For example, a single play of a song can be defined as a user listening to a song for at least 30 seconds. The media object can be streamed or stored (i.e. downloaded).

In step S104, the streaming or download data is accessed from a file system 140. The file system 140 cart be a distributed file system and could, for example, be any presently or fixture known distributed file system and associated software framework, for example Apache Hadoop Distributed File System (FIDFS) and Apache MapReduce. The data stored in the file system 140 can include any user activity automatically collected by a media streaming or downloading service.

In step S105, a breakout value is calculated for the media object using the number of headline clusters (clusters$_{first\ time\ period}$) counted in step S103, the number of content consumers over the first time period (consumers$_{first\ time\ period}$) counted in step S104, and the number of content consumers over the second time period (consumers$_{second\ time\ period}$) counted in step S104.

In step S105, the breakout value can be calculated, for example, according, to the following equation:

$$\text{value} = \frac{\text{consumers}_{first\ time\ period} * \log(\text{clusters}_{first\ time\ period})}{\text{consumers}_{second\ time\ period} * \sqrt{\text{consumers}_{second\ time\ period}}} \qquad (1)$$

Equation 1 can be modified in any number of ways to improve the prediction accuracy of the breakout value.

Figure 2:
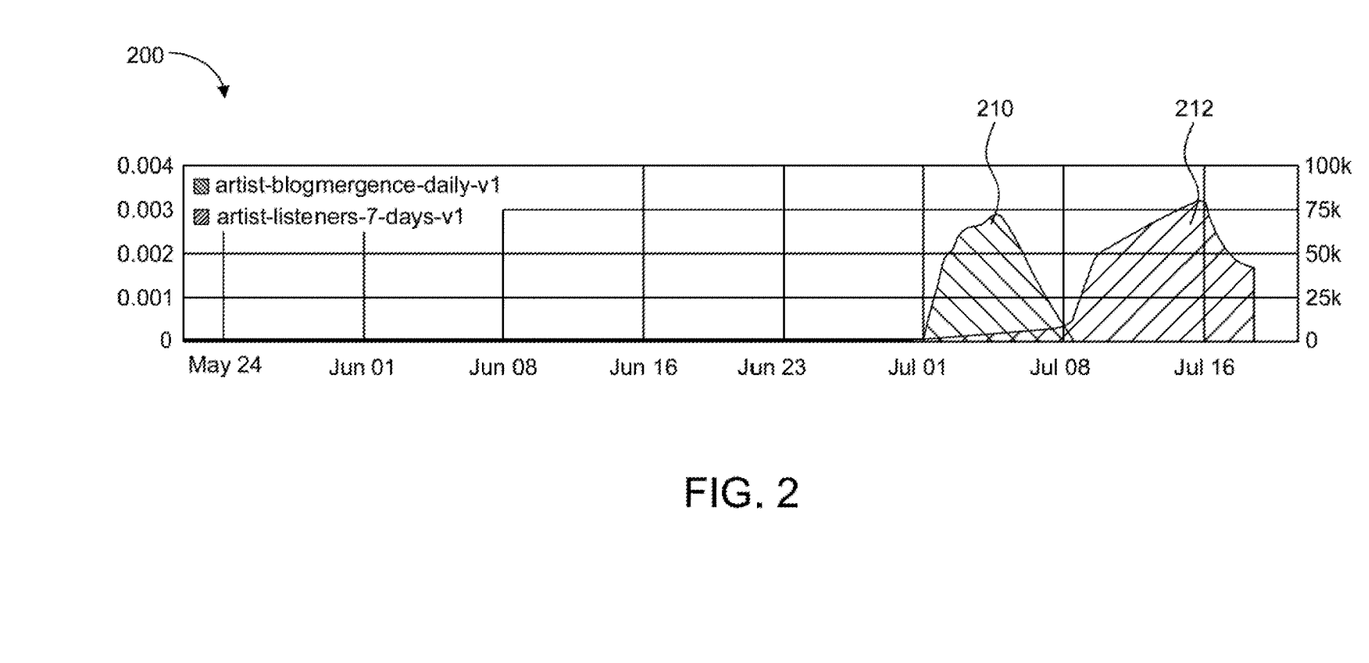
FIG. 2 illustrates an example interface for evaluating a prediction of breakout content according to an example embodiment of the invention.

FIG. 2 illustrates an example interface for evaluating a prediction of breakout content according to an example embodiment.

Once a breakout value has been calculated for a media object, for example, as described in FIG. 1, it can be used as a metric corresponding to a prediction of the potential breakout success of the media object. This prediction can be evaluated by comparing the breakout value over time with the number of plays of the media object over time.

For example, FIG. 2 shows a graph 200 that plots the daily breakout value for a media object against a number of plays of the media object over time. In the example, the breakout value is called a "blogmergence" value, which is shown as a plot 210 for a given artist. The number of plays for that artist is shown as a plot 212 of a median shift number of plays over a 7-day time frame.

In this example, median shift describes a method of illustrating media object plays over time that factors out anomalies in user listening or viewing behavior. An example median shift is calculated according to the following equation:

$$\text{Median Shift} = \frac{thisMedian - lastMedian}{(lastMedian + \text{penalty})} \qquad (2)$$

In equation 2, thisMedian is the median number of content consumers for a most recent time frame. For example, the most recent time frame might be the current week or day. LastMedian is a median number of content consumers for the previous time frame. For example, the previous time frame might be last week or yesterday. Penalty is a constant used to mitigate trivial cases in which a media object increases in play count by an insignificant amount. For example, such a trivial case may be a song that is listened to 10 times during a first week and 30 times during a second week. An example penalty constant in such a case may be set to, for example, 1000.

Although a median shift is a useful metric for displaying media object plays over time, any other presently or future known methodology can be used to evaluate a breakout value. In the example of FIG. 2, a spike in median shift 212 follows a spike in breakout value 210, indicating that the breakout values successfully predicted the subsequent spike in popularity for the artist.

Figure 3A:
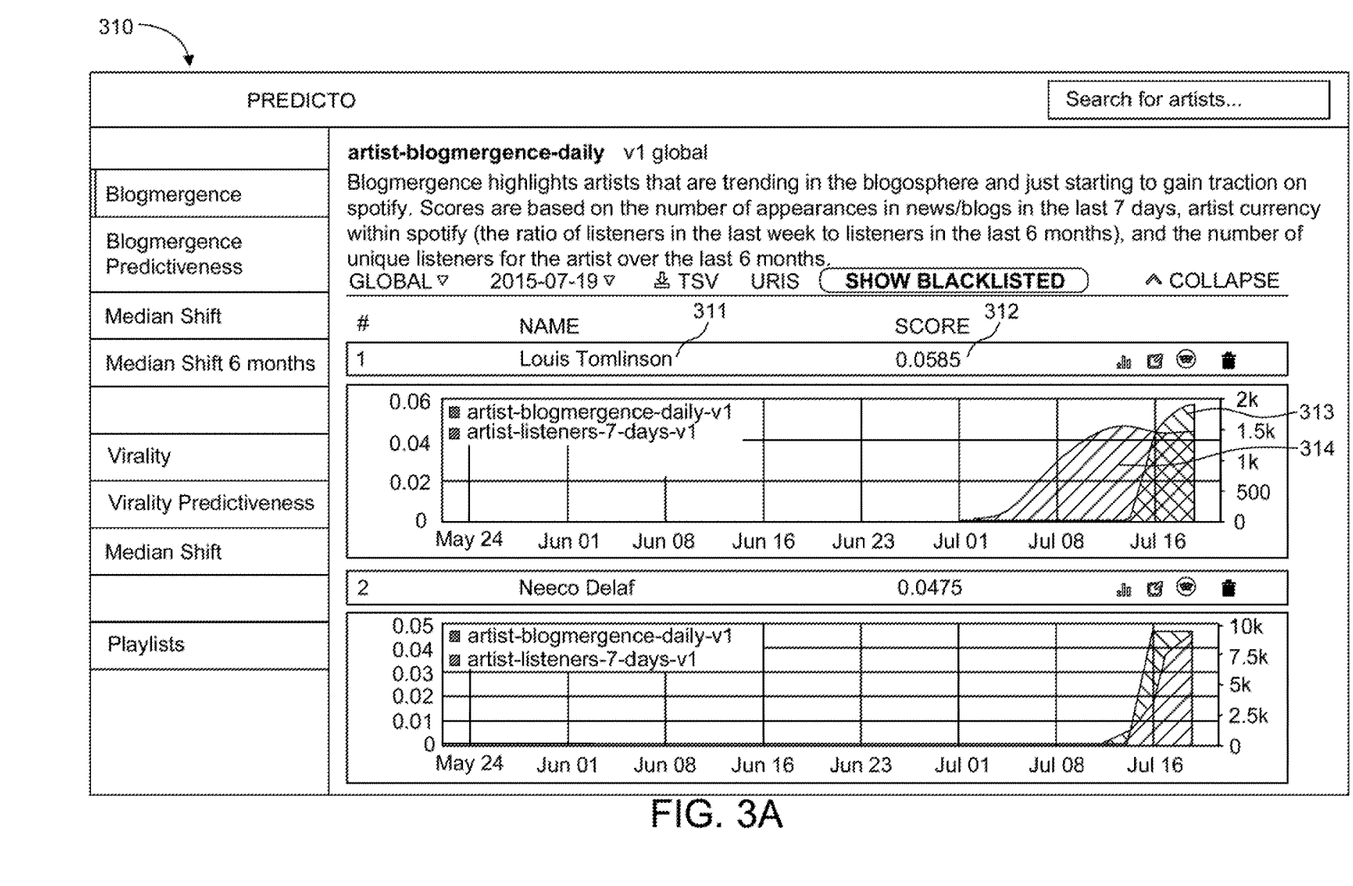
FIGS. 3A, 3B and 3C illustrate additional example interfaces for evaluating a prediction of breakout content according to an example embodiment of the invention.
Figure 3B:
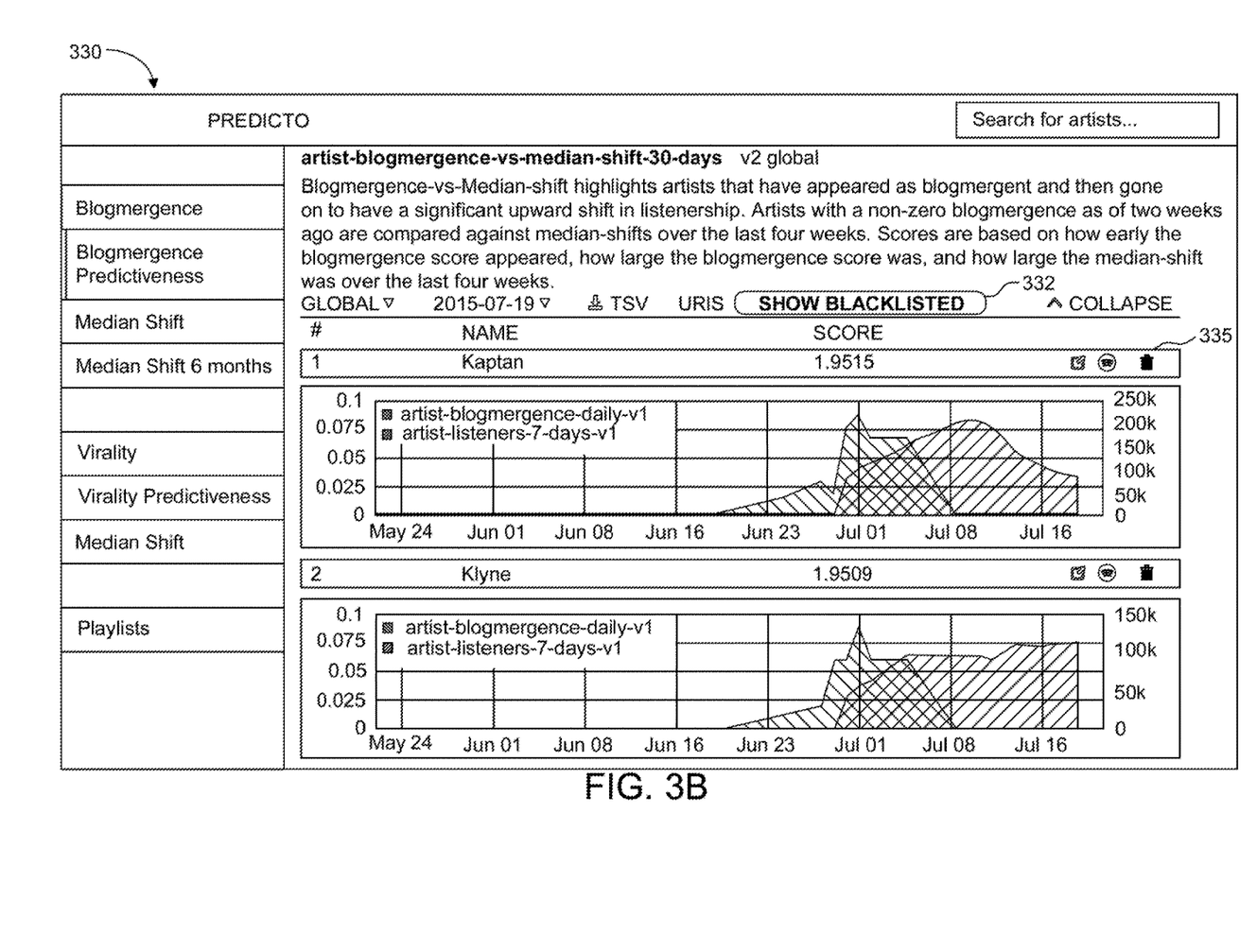
Figure 3C:
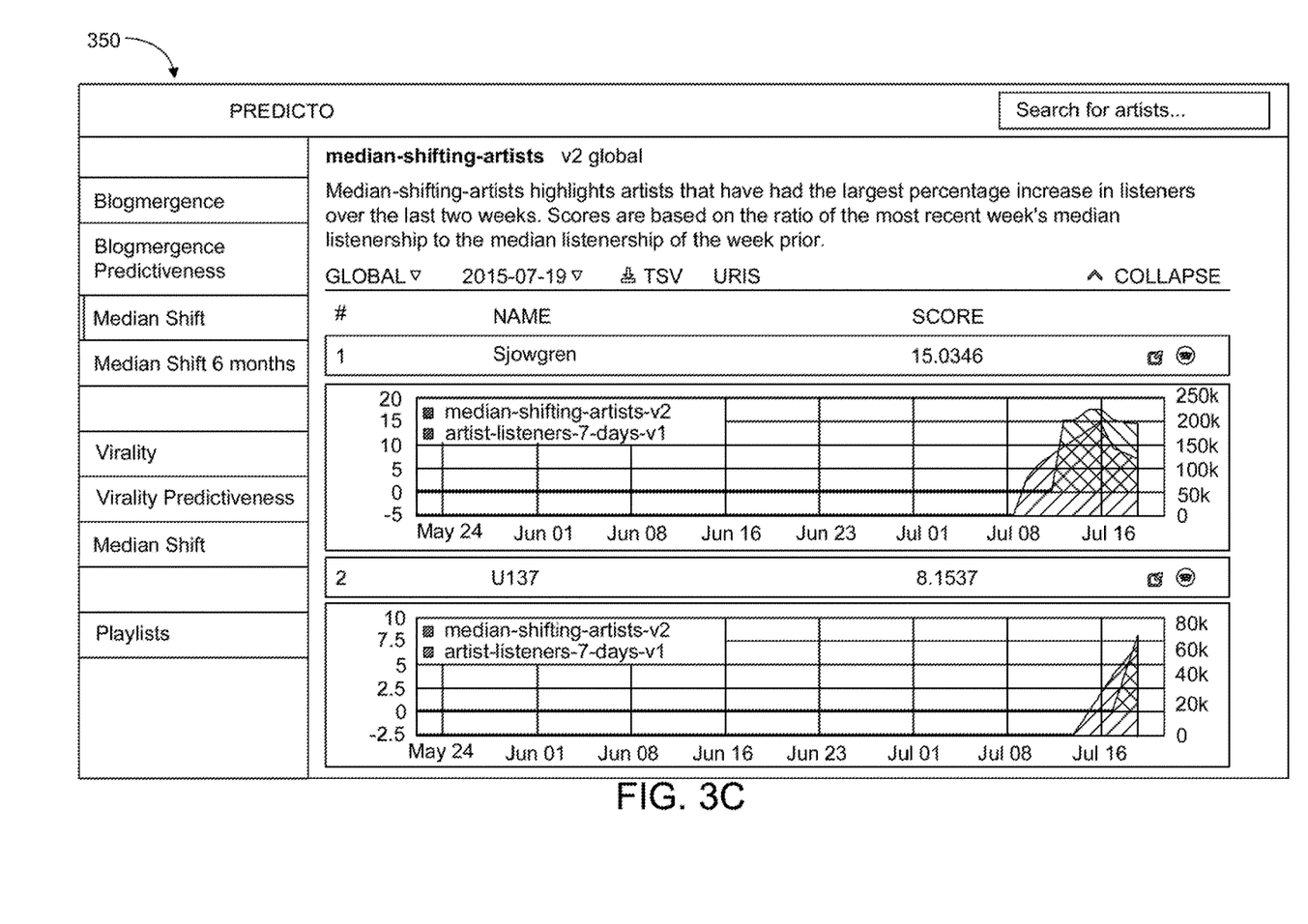

FIGS. 3A, 3B and 3C (collectively FIG. 3) illustrate additional example interfaces for evaluating, a prediction of breakout content according to an example embodiment.

Interfaces 310, 330 and 350 each illustrate an example interface for evaluating breakout predictions by comparing breakout values to media plays over time. The example interface 310 shows examples of several artists and, for each artist, plots a daily measure of breakout value or "blogmergence" against the number of media plays for the artist over a 7-day period.

Label 311 indicates the entity being evaluated within the dashboard. In this example, an artist is being evaluated, but a dashboard could alternatively receive inputs for evaluating an individual song, movie, game, etc. Label 312 depicts a breakout value or "blogmergence" value for the artist. Plot 313 is a plot of breakout value for the artist. Plot 314 is a plot of media plays over a 7-day period.

Interface 330 shows examples of artists who have observed increased media plays as shown by positive median shifts over a 30-day period. The median shifts are plotted against daily breakout values for each artist. Interface 350 shows examples of artists with large percentage increases in listeners over a two-week period. Again, for each artist, media plays are plotted against breakout values.

In interface 330, icons 332 and 335 show examples of user interface elements that toggle or enable editorial filtering (e.g. blacklisting) features in the interface. For example, icon 335 allows a user to "blacklist" an artist or, in other words, indicate to the interface system that an artist with a high breakout value is, in fact, not predicted to breakout or is not, for example, a new artist. In some examples, a human user can do this editorial blacklisting. In other examples, the editorial blacklisting, can be done using a computer interface for receiving various inputs. For example, editorial blacklisting, may exclude an entity, such as an artist or a song, based on qualitative inputs such as current or cultural events involving or affecting the artist, the time of year or holidays, or the history of the artist's discography or filmography.

Again, FIG. 3 provides only three examples of interfaces for evaluating breakout value calculations, but breakout values can be inputted into an interface and visually compared to media plays by any presently or future known methods.

Figure 4:
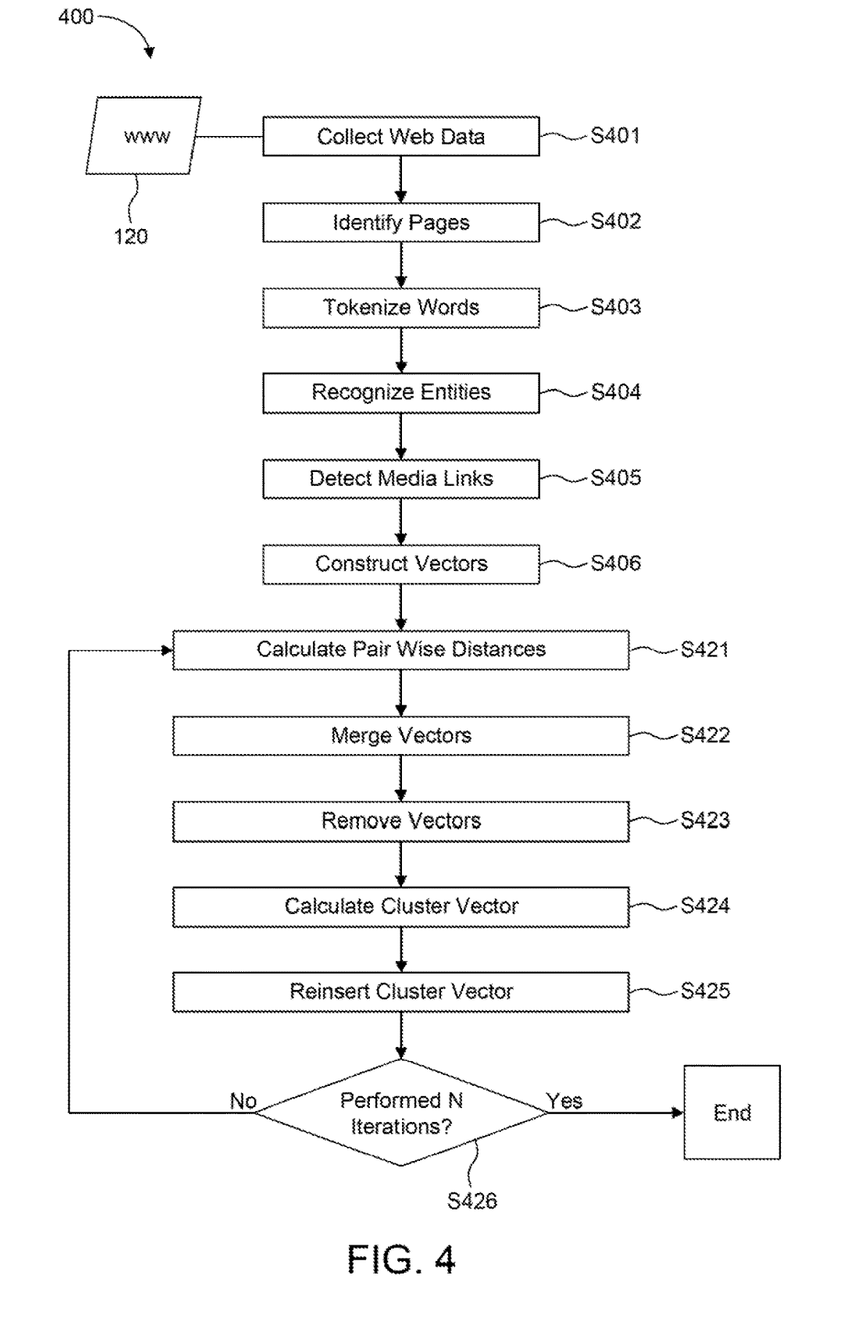
FIG. 4 is a flow diagram of a process for clustering pages into headline clusters according to an example embodiment of the invention.

FIG. 4 is a flow diagram of a process for clustering pages into headline clusters according to an example embodiment.

In step S401, web content is collected from the World Wide Web 120, in step S402, individual web pages are identified from within the collected web content.

In step S403, the unique words in each web page are tokenized. This can be done, for example, using whitespace tokenization techniques or any other known methods of lexical analysis. Whitespace tokenization, for instance, identifies each string of characters separated by spaces as tokens. In some example embodiments, the tokenization step S403 also includes a step of weighting each of the tokens based on the location of the unique word within the web page. For example, a unique word found in the title of the web page may be weighted more than a unique word found in the body of the web page.

In step S404, unique entities or artists mentioned in each web page are identified. In step S405, embedded media objects or media links are detected in each web page. This can be done, for example, by parsing inline frames (e.g. iframe tags) from the HyperText Markup Language (HTML) code of each page. Additionally, direct links to the media object can be extracted by removing extraneous uniform resource locator (URL) arguments from the results of the parsing step.

Steps S403 through S405 can be performed in any order.

In step S406, vector representations are then constructed for each web page. In an example embodiment, a first dimension of each vector includes the unique words tokenized in each web page, a second dimension of each vector includes the unique artists or entities recognized in each web page, and a third dimension of each vector includes the embedded media or media links detected in each web page. In other example embodiments, the vector representations can be constructed in any high number of dimensions.

In steps S421 through S426, a clustering heuristic is performed on the plurality of vector representations.

In step S421, the pairwise cosine distance between two vectors among the plurality of vector representations is calculated. Pairwise cosine distance between two vectors A and B may be calculated according to following formula:

$$\text{Pairwise Cosine Distance} = 1 - \frac{A \cdot B}{\|A\| \, \|B\|} = 1 - \left(\sum_{i=1}^{n} A_i B_i\right) \Big/ \left(\sqrt{\sum_{i=1}^{n} A_i^2} \, \sqrt{\sum_{i=1}^{n} B_i^2}\right) \quad (3)$$

In equation 3, $A_i$ and $B_i$ are components of vector A and B respectively. The lower the pairwise cosine distance, the more similar the vectors are.

In step S422, if the pairwise cosine distance is below a threshold value, the two vectors are merged into a duster. In an example embodiment, the threshold value is 0.25.

In step S423, the two vectors are removed from the plurality of vector representations. In step S424, a cluster vector representation of the two vectors is calculated, for example, as the mean of all vectors in the cluster. In step S425, the cluster vector representation is reinserted into the plurality of vector representations.

The clustering heuristic, performed in steps S421 through S425 can be repeated any number of times until a desired number of clusters is achieved. In step S426, if the clustering heuristic has been performed for a desired number of iterations, N, the heuristic ends. If the clustering heuristic has not yet finished N iterations, the heuristic repeats by returning to step S421. In an example embodiment, 3 iterations of the clustering heuristic are performed.

In an alternative example embodiment, an affinity propagation technique is used to cluster the plurality of vector representations.

Figure 5:
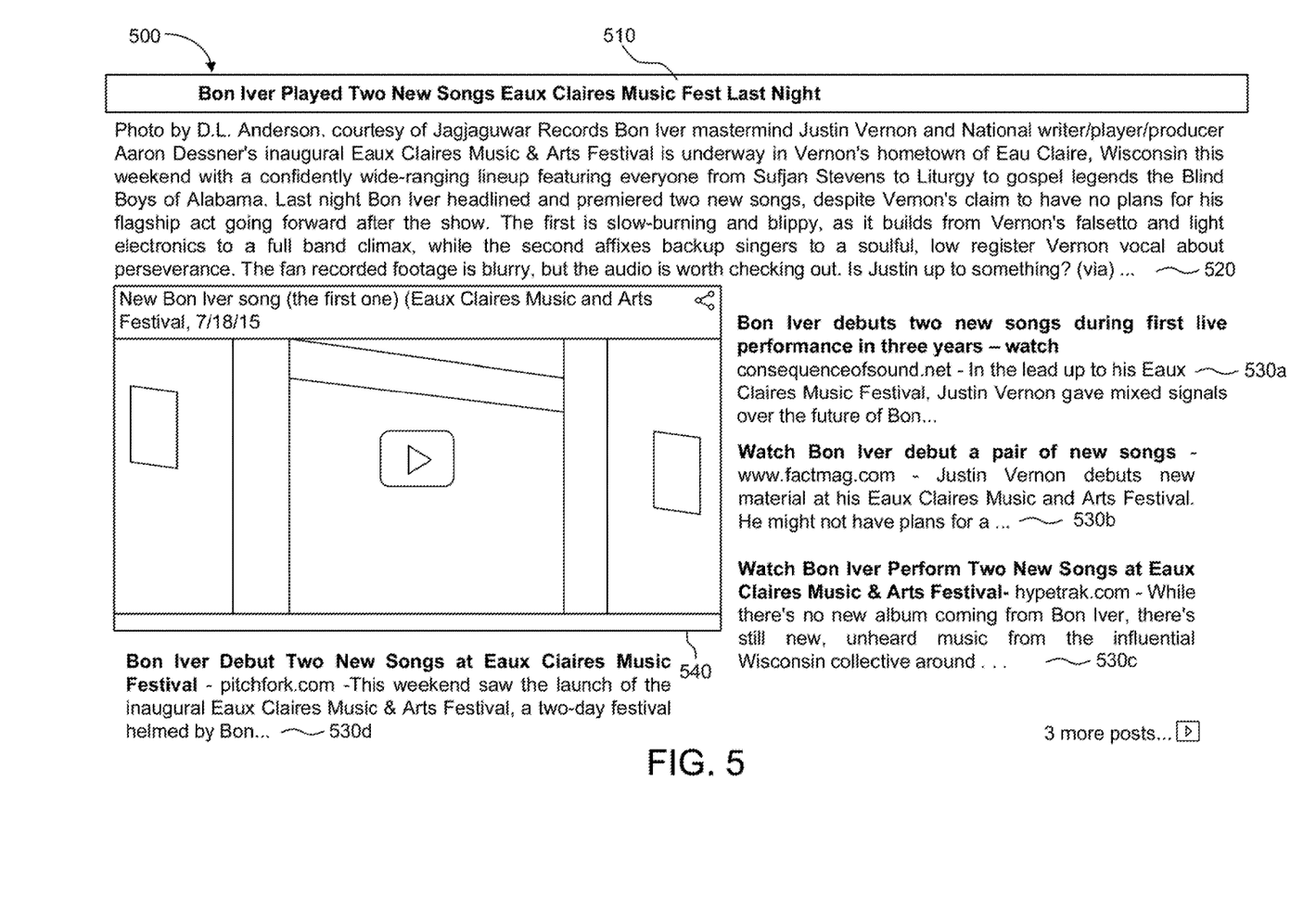
FIG. 5 illustrates a headline cluster according to an example embodiment of the invention.

FIG. 5 illustrates a headline cluster according to an example embodiment. In FIG. 5, cluster 500 is shown as a visualization of several web pages 530a, 530b, 530c and 530d that have been clustered under a headline 510. Summary 520 is an example summary of the unique words that are tokenized as part of the clustering method. Image 540 is an example of an embedded media object included in cluster 500.

According to another example embodiment, a system uses a selected cohort of content consumers to rate a media object. For example, the system can select a cohort of content consumers who played content from one or more breakout artists before the content became popular. The system can then rate any media object based on the number of content consumers in that cohort who have listened to the media object. The example system identifies a media object and determines a first value (first value in equation 4 below) and a second value (second value in equation 4 below). The first value is equal to the number of consumers who belong to a cohort and who have played the media object. The second value is equal to the total number of content consumers who played the media object. The system computes a rating for the media object using the first value and the second value.

In an example aspect of the embodiment, the rating is calculated according to the following formula:

$$\text{rating} = \frac{\text{first value}}{\text{second value} + \text{third value}} \quad (4)$$

In equation 4, third value is a constant used to adjust the rating to give weight to the popularity of the media object among the total number of content consumers. In one example, the third value is equal to 50.

In one example, the media object is selected, based on a number of plays of the media object. In another example, the media object is selected based on a release date of the media object. In yet another example, the media object is selected based on a combination of a number of plays of the media object and a release date of the media object.

In another example aspect of the embodiment, the rating is calculated according to the following formula:

$$\text{rating} = \frac{(\text{first value})^2}{(\text{first value} + x) + (\text{second value} + y)} \quad (5)$$

In equation 5, x is a constant used to weight the rating in favor of popularity among total users and y is a constant used to weight the rating in favor of popularity among the cohort. In some example embodiments, equation 5 can be modified in a number of ways to weight the first value, second value and constants x and y in different was to provide different metrics or to control the absolute range of possible rating scores.

According to another example embodiment, a system identifies a media object and determines a first value equal to a number of content consumers who belong to a cohort and who played the media object during a first time period. The system then determines a second value equal to a total number of content consumers who played the media object during a second time period. The system then computes a rating for the media object using the first and second value.

In an example aspect of the embodiment, the first time period is less than the second time period. For example, the first time period is 1 month and the second time period is 1.5 months.

In an example, the cohort includes content consumers within a predefined geographic region. In another example, the cohort includes content consumers in a predefined demographic.

Figure 6:
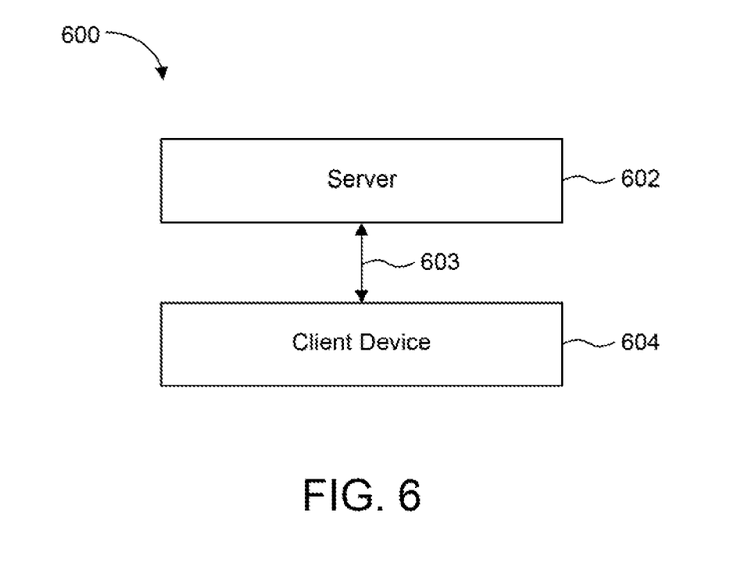
FIG. 6 is a block diagram of an example client-server data system configured in accordance with the principles of the invention.

FIG. 6 is a block diagram of an example client-server data system 600 configured in accordance with the principles of the invention. Data system 600 can include server 602 and client device 604. In some embodiments, data system 600 can include multiple servers 602, multiple client devices 604, or both multiple servers 602 and multiple client devices 604. For simplicity, only one server 602 and one client device 604 are illustrated.

Server 602 may include any suitable types of servers that can store and provide data to client device 604 (e.g., file server, database server, web server, or media server). Server 602 can store data, and server 602 can receive data download requests from client device 604.

In some embodiments, server 602 can obtain and process data from one or more client devices 604.

Server 602 can communicate with client device 604 over communications link 603. Communications link 603 can include any suitable wired or wireless communications link, or combinations thereof, by which data may be exchanged between server 602 and client 604. For example, communications link 603 can include a satellite link, a fiber-optic link, a cable link, an Internet link, or any other suitable wired or wireless link. Communications link 603 may enable data transmission using any suitable communications protocol supported by the medium of communications link 603. Such communications protocols may include, for example, Wi-Fi (e.g., a 802.11 protocol), Ethernet, Bluetooth, radio frequency systems (e.g., 900 MHz, 2.4 GHz, and 5.6 GHz communication systems), infrared, TCP/IP (e.g., the protocols used in each of the TCP/IP layers), HTTP, BitTorrent, FTP, RTP, RTSP, SSH, any other communications protocol, or any combination thereof.

Client device 604 can include any electronic device capable of communicating and/or displaying or providing data to a user and may be operative to communicate with server 602. For example, client device 604 can include a portable media player, a cellular telephone, pocket-sized personal computers, a desktop computer, a laptop computer, and any other device capable of communicating via wires or wirelessly (with or without the aid of a wireless enabling accessory device).

Figure 7:
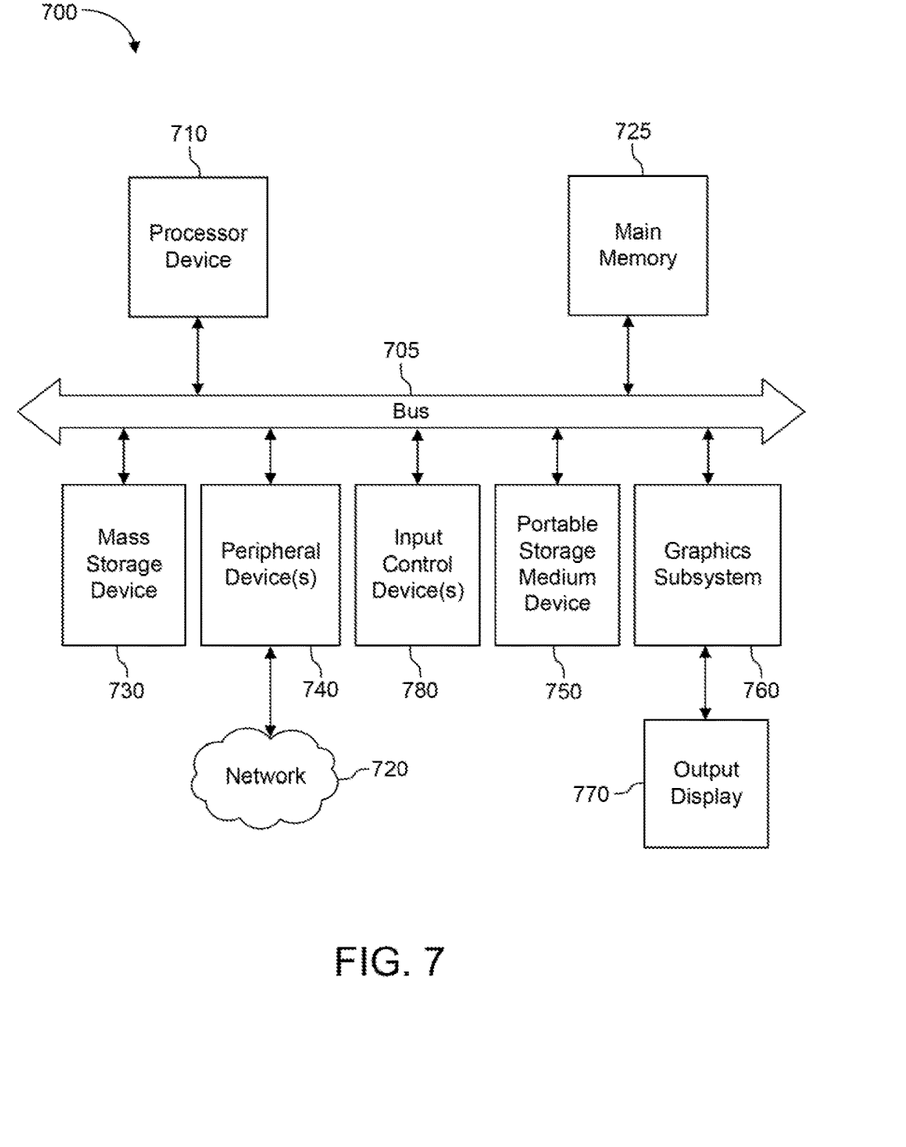
FIG. 7 is a block diagram of a general and/or special purpose computer, which may be a general and/or special purpose computing device, in accordance with some of the example embodiments of the invention.

FIG. 7 is a block diagram of a general and/or special purpose computer, which may be a general and/or special purpose computing device, in accordance with some of the example embodiments. The computer 700 may be, for example, the same or similar to client device (e.g., 604, FIG. 6), a user computer, a client computer and/or a server computer (e.g., (02, FIG. 6), among other things, or can be a device not operative to communicate with a server.

The computer 700 may include, without limitation, a processor device 710, a main memory 725, and an interconnect bus 705. The processor device 710 may include, without limitation, a single microprocessor, or may include a plurality of microprocessors for configuring the computer 700 as a multi-processor system. The main memory 725 stores, among other things, instructions and/or data for execution by the processor device 710. The main memory 725 may include banks of dynamic random access memory (DRAM), as well as cache memory.

The computer 700 may further include a mass storage device 730, peripheral device(s) 740, portable non-transitory storage medium device(s) 750, input control device(s) 780, a graphics subsystem 760, and/or an output display interface 770. For explanatory purposes, all components in the computer 700 are shown in FIG. 7 as being coupled via the bus 705. However, the computer 700 is not so limited. Devices of the computer 700 may be coupled via one or more data transport means. For example, the processor device 710 and/or the main memory 725 may be coupled via a local microprocessor bus. The mass storage device 730, peripheral device(s) 740, portable storage medium device(s) 750, and/or graphics subsystem 760 may be coupled via one or more input/output (I/O) buses. The mass storage device 730 may be a nonvolatile storage device for storing data and/or instructions for use by the processor device 710. The mass storage device 730 may be implemented, for example, with a magnetic disk drive or an optical disk drive. In a software embodiment, the mass storage device 730 is configured for loading contents of the mass storage device 730 into the main memory 725.

The portable storage medium device 750 operates in conjunction with a nonvolatile portable storage medium, such as, for example, a compact disk read only memory (CD-ROM), to input and output data and code to and from the computer 700. In some embodiments, the software for storing information may be stored on a portable storage medium, and may be inputted into the computer 700 via the portable storage medium device 750. The peripheral device(s) 740 may include any type of computer support device, such as, for example, an input/output (I/O) interface configured to add additional functionality to the computer 700. For example, the peripheral device(s) 740 may include a network interface card for interfacing the computer 700 with a network 720.

The input control device(s) 780 provide a portion of the user interface for a user of the computer 700. The input control device(s) 780 may include a keypad and/or a cursor control device. The keypad may be configured for inputting alphanumeric, characters and/or other key information. The cursor control device may include, for example, a handheld controller or mouse, a trackball, a stylus, and/or cursor direction keys. In order to display textual and graphical information, the computer 700 may include the graphics subsystem 760 and the output display 770. The output display 770 may include a display such as a CSTN (Color Super Twisted Nematic), TFT (Thin Film Transistor), TFD (Thin Film Diode), OLED (Organic Light-Emitting Diode), AMOLED display (Activematrix organic light-emitting diode), and/or liquid crystal display (LCD)-type displays. The displays can also be touchscreen displays, such as capacitive and resistive-type touchscreen displays.

The graphics subsystem 760 receives textual and graphical information, and processes the information for output to the output display 770.

Each component of the computer 700 may represent a broad category of a computer component of a general and/or special purpose computer. Components of the computer 700 are not limited to the specific implementations provided here.

Software embodiments of the example embodiments presented herein may be provided as a computer program product, or software, that may include an article of manufacture on a machine-accessible or machine-readable medium having instructions. The instructions on the non-transitory machine-accessible, machine-readable, or computer-readable medium may be used to program a computer system or other electronic device. The machine-accessible, machine-readable, or computer-readable medium may include, but is not limited to, floppy diskettes, optical disks, CDROMs, and magneto-optical disks or other types of media/machine-readable medium suitable for storing or transmitting electronic instructions. The techniques described herein are not limited to any particular software configuration. They may find applicability in any computing or processing environment. The terms "computer-readable", "machine-accessible medium" or "machine-readable medium" used herein shall include any medium that is capable of storing, encoding, or transmitting a sequence of instructions for execution by the machine and that causes the machine to perform any one of the methods described herein. Furthermore, it is common in the art to speak of software, in one form or another (e.g., program, procedure, process, application, module, unit, logic, and so on) as taking an action or causing a result. Such expressions are merely a shorthand way of stating that the execution of the software by a processing system causes the processor to perform an action to produce a result.

Input control devices 780 can control the operation and various functions of computer 700.

Input control devices 780 can include any components, circuitry, or logic operative to drive the functionality of computer 700. For example, input control device(s) 780 can include one or more processors acting under the control of an application.

Figure 8:
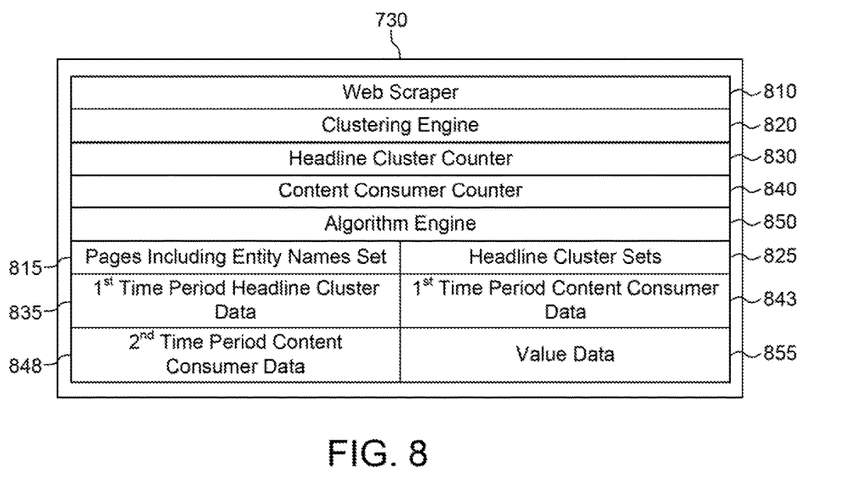
FIGS. 8-11 depict a mass storage device according to example embodiments.

FIG. 8 depicts a mass storage device 730 according to one embodiment. In this example embodiment, mass storage device 730 stores a web scraper 810, a clustering engine 820, a headline cluster counter 830, a content consumer counter 840, and an algorithm engine 850. The web scraper 810 scrapes a network for pages that include a name of an entity 815. The clustering engine 820 clusters the pages into one or more headline clusters 825. The headline cluster counter 830 counts a number of the headline clusters over a first time period 835. The content consumer counter 840 counts a number of content consumers for the entity over the first time period 843 and a number of content consumers for the entity over a second time period 848. An algorithm engine 850 calculates a value 855 using the number of headline clusters over the first time period 835, the number of content consumers over the first time period 843 and the number of content consumers over the second time period 848.

Figure 9:
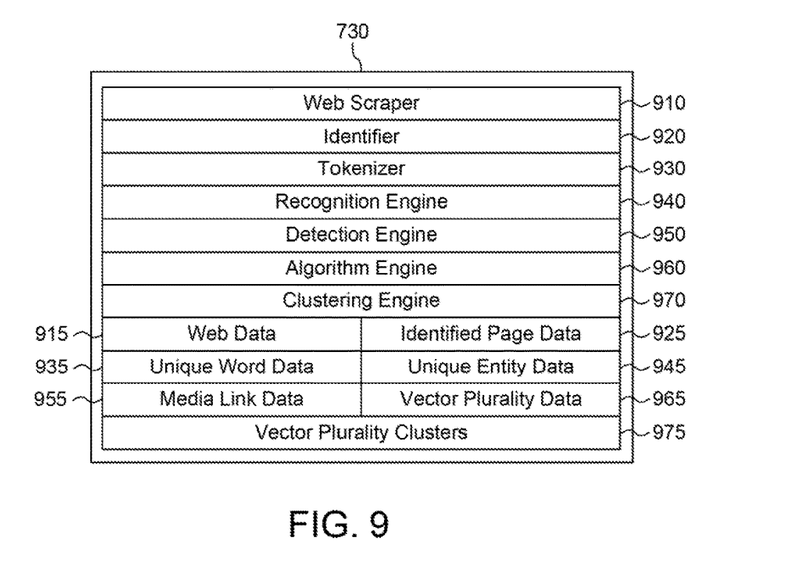

FIG. 9 depicts a mass storage device according to another embodiment. In this example embodiment, mass storage device 730 stores a web scraper 910, an identifier 920, a tokenizer 930, a recognition engine 940, a detection engine 950, an algorithm engine 960, and a clustering engine 970. The web scraper 910 collects web data 915. The identifier 920 identifies one or more pages 925 from the web data 915. The tokenizer 930 tokenizes one or more unique words 935 in each page 925. The recognition engine 940 recognizes one or more unique entities 945 in each page 925. The detection engine 950 detects one or more media links 955 in each page 925. The algorithm engine 960 constructs a plurality of vector representations 965 of each page 925, wherein a first dimension of each vector representation 965 includes the one or more unique words 935 tokenized in each page 925, a second dimension of each vector representation includes the one or more unique entities 945 recognized in each page 925, and a third dimension of each vector representation includes the one or more media links 955 detected in each page 925. The clustering engine 970 clusters the plurality of vector representations 965 into vector plurality clusters 975.

Figure 10:
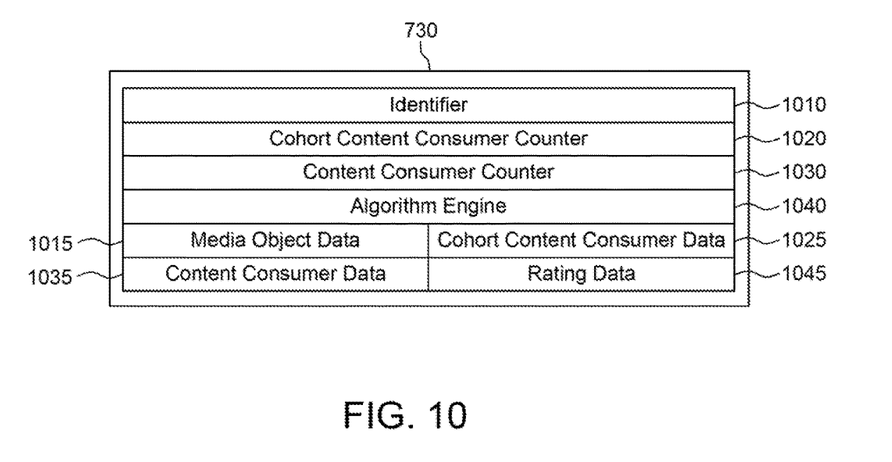

FIG. 10 depicts a mass storage device according to yet another embodiment. In this example embodiment, mass storage device 730 stores an identifier 1010, a cohort content consumer counter 1020, a content consumer counter 1030, and an algorithm engine 1040. The identifier 1010 identifies the media object. 1015. The cohort content consumer counter 1020 determines a first value equal to a number of content consumers that belong to a cohort 1025 and that have played the media object 1015. The content consumer counter 1030 determines a second value equal to a total number of content consumers 1035 that played the media object 1015. The algorithm engine 1040 computes a rating 1045 using the first value 1025 and the second value 1035.

Figure 11:
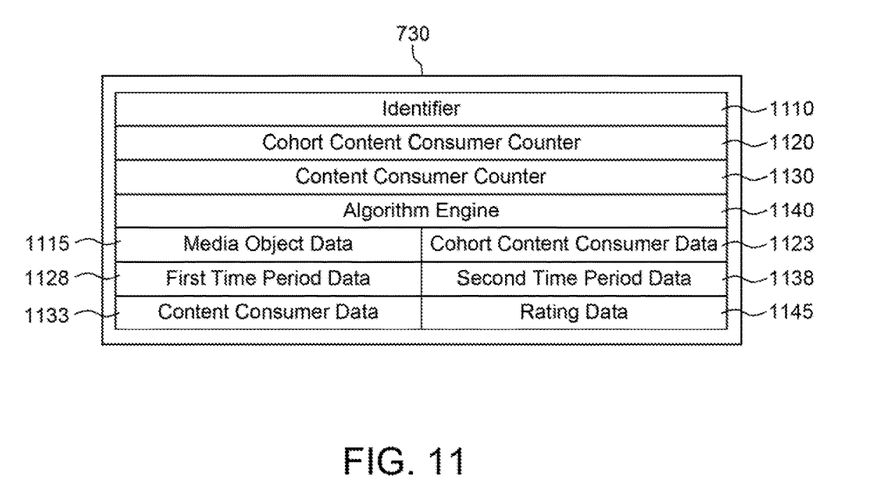

FIG. 11 depicts a mass storage device according to another embodiment, in this example embodiment, mass storage device 730 stores an identifier 1110, a cohort content consumer counter 1120, content consumer counter 1130, and an algorithm engine 1140. The identifier 1110 identifies the media object 1115. The cohort content consumer counter 1120 determines a first value equal to a number of content consumers that belong to a cohort 1123 and that have played the media object 1115 during a first time period 1128. The content consumer counter 1130 determines a second value equal to a total number of content consumers 1133 that played the media object 1115 during a second time period 1138. The algorithm engine 1140 computes a rating 1145 using the first value 1123 and the second value 1133.

Although the invention has been described and illustrated in the foregoing illustrative embodiments, it is understood that the present disclosure has been made only by way of example, and that numerous changes in the details of embodiment of the invention can be made without departing from the spirit and scope of the invention, which is only limited by the claims which follow. Features of the disclosed embodiments can be combined and rearranged in various ways.

In addition, it should be understood that the figures are presented for example purposes only. The architecture of the example embodiments presented herein is sufficiently flexible and configurable, such that it may be utilized and navigated in ways other than that shown in the accompanying figures. Further, the purpose of the Abstract is to enable U.S. Patent and Trademark Offices, U.S. Patent Offices in countries foreign to the U.S., and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the example embodiments presented herein in any way. It is also to be understood that the procedures recited in the claims need not be performed in the order presented.

What is claimed is:

1. A computer-implemented method for predicting breakout success by determining a breakout value for one or more unique entities based on clustering pages into headline clusters, the method comprising the steps of:
    collecting web data;
    identifying one or more pages from the web data;
    tokenizing one or more unique words in each page;
    recognizing one or more unique entities in each page;
    detecting one or more media links in each page;
    constructing a plurality of vector representations of each page, wherein a first dimension of each vector representation includes the one or more unique words tokenized in each page, a second dimension of each vector representation includes the one or more unique entities recognized in each page, and a third dimension of each vector representation includes the one or more media links detected in each page;
    clustering the plurality of vector representations to form one or more clusters;
    calculating a breakout value for the one or more unique entities using the one or more clusters; and
    providing the breakout value for the one or more unique entities as output,
    wherein the clustering step is performed using a clustering heuristic comprising the steps of:
        calculating a pairwise cosine distance between two vector representations of the plurality of vector representations that have not yet been clustered; and
        merging the two vector representations into a cluster if the pairwise cosine distance is below a threshold value;
        removing the two vector representations from the plurality of vector representations if the pairwise cosine distance is below the threshold value;
        calculating a cluster vector representation for the cluster as the mean of all vector representations in the cluster;
        reinserting the cluster vector representation into the plurality of vector representations; and
        repeating the clustering heuristic for a set number of iterations.

2. The method according to claim 1, wherein the one or more media links are detected in each page by parsing inline frames from HyperText Markup Language (HTML) code of each page.

3. The method according to claim 1, wherein detecting the one or more media links in each page comprises the steps of:
    parsing source elements from inline frames from HyperText Markup Language (HTML) code of each page; and
    removing extraneous uniform resource locator (URL) arguments from results of the parsing step.

4. The method according to claim 1, wherein the tokenizing one or more unique words in each page further includes a step of weighting the one or more unique words based on their location in the page.

5. The method according to claim 1, wherein the clustering is performed using an affinity propagation clustering technique.

6. The method according to claim 1, wherein the threshold value is 0.25.

7. The method according to claim 1, wherein the set number of iterations is 3.

8. A system comprising a processing unit adapted to perform the method as in any of claims 1-5, 6, and 7.

9. A non-transitory computer-readable storage medium storing a program for causing a computer to implement the method as in any of claims 1-5, 6, and 7.

* * * * *